US009644273B2

(12) United States Patent
Raybould et al.

(10) Patent No.: US 9,644,273 B2
(45) Date of Patent: May 9, 2017

(54) PROTECTIVE BARRIER COATINGS

(75) Inventors: Derek Raybould, Denville, NJ (US);
Thomas E. Strangman, Prescott, AZ (US); Christian DelaCruz, Parsippany, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 2140 days.

(21) Appl. No.: 11/704,447

(22) Filed: Feb. 9, 2007

(65) Prior Publication Data

US 2008/0193657 A1    Aug. 14, 2008

(51) Int. Cl.
| B05D 3/12 | (2006.01) |
| C23C 24/08 | (2006.01) |
| C23C 18/04 | (2006.01) |
| C23C 18/12 | (2006.01) |
| C23C 26/00 | (2006.01) |

(Continued)

(52) U.S. Cl.
CPC .............. *C23C 24/08* (2013.01); *C23C 18/04* (2013.01); *C23C 18/1216* (2013.01); *C23C 18/1225* (2013.01); *C23C 18/1241* (2013.01); *C23C 18/1254* (2013.01); *C23C 26/00* (2013.01); *C23C 28/321* (2013.01); *C23C 28/325* (2013.01); *C23C 28/345* (2013.01); *C23C 28/3455* (2013.01); *C23C 28/42* (2013.01); *F01D 5/286* (2013.01); *F01D 5/288* (2013.01); *F05D 2230/90* (2013.01); *Y02T 50/67* (2013.01)

(58) Field of Classification Search
CPC .... C23C 24/08; C23C 28/325; C23C 18/1225
USPC ..................................................... 427/376.2
See application file for complete search history.

(56) References Cited

U.S. PATENT DOCUMENTS 5,514,482 A * 5/1996 Strangman ..................... 428/623
5,562,998 A    10/1996 Strangman
(Continued)

FOREIGN PATENT DOCUMENTS

EP            926261 A2 *   6/1999 ............. C23C 18/12
EP            0926261 A2    6/1999
(Continued)

OTHER PUBLICATIONS

Brinker, Sol-Gel Science, Academic Press Inc., 1990, p. 2-5 and 8-9.*
EP Search Report, 08101342.7 dated Aug. 8, 2008.

Primary Examiner — Tabatha Penny
(74) Attorney, Agent, or Firm — Lorenz & Kopf, LLP

(57) ABSTRACT

Exemplary embodiments of the invention provide barrier coated substrates and methods of coating a substrate with a barrier coating derived from sol gels. An example includes a barrier coated aerospace component that is subject to hot salt corrosion during use. The barrier coating is derived from oxidation of a coating composition that includes at least one sol gel. The barrier coating resists hot salt corrosion for an incubation period of such duration that an uncoated superalloy substrate under the same conditions would suffer corrosion to a depth of about 2.0 mils. Methods of applying the barrier coating include the steps of selecting a first liquid sol gel and wetting surfaces of the superalloy substrate with the selected first liquid sol gel. The wetted surfaces of the superalloy substrate are subjected to heat treatment. The heat treatment includes sintering of sol gel to oxide to produce a barrier coating.

8 Claims, 2 Drawing Sheets

(51) Int. Cl.
*F01D 5/28* (2006.01)
*C23C 28/00* (2006.01)

(56) References Cited

U.S. PATENT DOCUMENTS

| | | | |
|---|---|---|---|
| 5,611,828 A * | 3/1997 | Celikkaya | 51/309 |
| 5,660,524 A * | 8/1997 | Lee | F01D 5/182 |
| | | | 415/115 |
| 5,759,932 A * | 6/1998 | Sangeeta et al. | 501/85 |
| 5,869,144 A * | 2/1999 | Stavros | C23C 2/003 |
| | | | 427/376.2 |
| 5,939,197 A | 8/1999 | Blohowiak et al. | |
| 6,071,622 A * | 6/2000 | Beesabathina | C23C 18/1212 |
| | | | 428/426 |
| 6,103,386 A * | 8/2000 | Raybould | C23C 28/00 |
| | | | 428/469 |
| 6,268,067 B1 | 7/2001 | Petrone et al. | |
| 6,294,260 B1 | 9/2001 | Subramanian | |
| 6,294,261 B1 * | 9/2001 | Sangeeta | C23C 4/18 |
| | | | 416/241 B |
| 6,365,281 B1 | 4/2002 | Subramanian et al. | |
| 6,579,472 B2 | 6/2003 | Chung et al. | |
| 6,818,252 B1 * | 11/2004 | Bornstein | C23C 18/1216 |
| | | | 427/372.2 |
| 6,887,588 B2 | 5/2005 | Ackerman et al. | |
| 6,933,060 B2 | 8/2005 | Subramanian et al. | |
| 2001/0054500 A1 * | 12/2001 | Raybould et al. | 165/166 |
| 2004/0115470 A1 * | 6/2004 | Ackerman | C23C 4/18 |
| | | | 428/660 |
| 2004/0200549 A1 * | 10/2004 | Cetel | C22C 19/056 |
| | | | 148/428 |
| 2005/0013994 A1 * | 1/2005 | Strangman | C23C 4/18 |
| | | | 428/336 |
| 2005/0112381 A1 * | 5/2005 | Raybould et al. | 428/446 |
| 2006/0068189 A1 * | 3/2006 | Raybould | C23C 4/18 |
| | | | 428/307.3 |
| 2006/0222884 A1 * | 10/2006 | Nagaraj | C23C 18/1208 |
| | | | 428/688 |
| 2009/0239061 A1 * | 9/2009 | Hazel | C23C 18/1208 |
| | | | 428/332 |

FOREIGN PATENT DOCUMENTS

| | | | | |
|---|---|---|---|---|
| EP | 1088908 A2 * | 4/2001 | | C23C 24/10 |
| EP | 1710398 A1 * | 10/2006 | | |
| EP | 1927675 A1 | 6/2008 | | |

* cited by examiner

PROTECTIVE BARRIER COATINGS

TECHNICAL FIELD

The embodiments described herein generally relate to protective coatings for objects, and more particularly relates to sol gel coatings that provide a protective barrier over an underlying substrate material.

BACKGROUND

Hot corrosion is a pervasive phenomenon in gas turbine engine components. Corrosive salts are typically sulfates, especially sodium and potassium sulfates which are constituents of ingested sea salt and salty dust. With regard to the gas turbine engine especially, inhaled or ingested salt normally does not pose a problem at temperatures in excess of about 1700° F. (927° C.), where the sulfate salts usually vaporize faster than they are deposited and as a result they are exhausted with little or no engine damage. But at intermediate temperatures, in the range from about 1000° F. (538° C.) to about 1700° F. (927° C.), the salts may be present as a molten deposit that is extremely corrosive.

Modern aircraft engine components may be fabricated of nickel or cobalt based "superalloys" that may exhibit relatively high corrosion resistance. However, even these superalloy components are subject to thinning as the salt deposit corrodes away the superalloy. Unless the component is replaced through routine inspection and maintenance procedures, it can become damaged to the extent that its function is adversely affected. Accordingly, the potential damage that may result from hot corrosion imposes routine inspection and maintenance schedules in the aerospace industry, even on parts made from superalloys.

Coatings have been used in an effort to counter act or limit the effect of corrosion on aerospace components. For example, platinum-aluminum (PtAl) or cobalt-chromium-aluminum-yttrium (CoCrAlY) and cobalt-nickel-chromium-aluminum-yttrium (CoNiCrAlY) coatings reduce the rate of corrosion to more acceptable levels. However, CoNiCrAlY coatings are deposited with processes that are incapable of coating the surfaces of internal air-cooling passages within a component. For example, the airfoil coating application processes are "line of sight" processes. These include plasma spraying and electron beam physical vapor deposition (EB-PVD). These line of sight processes have limitations with respect to capability to coat complex internal passage ways in a superalloy airfoil, for example. Internal surfaces may be coated with a thin NiAl layer using a gas phase or chemical vapor deposition aluminizing process, but NiAl is not as protective as the MCrAlY coatings. There has long been an identified need for an improved corrosion resistance within internal passageways.

Air acting as a coolant medium flows through these passageways to maintain the component's structural superalloy substrate in an acceptable temperature range that will reduce the likelihood of temperature-induced harm to the component. Salt or salty dust in the incoming coolant air may form deposits on the internal passage ways. Hot corrosion from these deposits may corrode the internal passage ways. This reduces performance of a component, such as an airfoil for example, and may necessitate the component's premature removal from service.

Accordingly, it is desirable to provide a corrosion barrier coating that is compatible with and adheres well to superalloys. The corrosion barrier coating may also increase the useful life of aluminide or CoNiCrAlY coated superalloy surfaces. The corrosion barrier should be stable at relatively high operating temperatures, such as those encountered in aircraft engines, for example. In addition, it is desirable that the coating be applied in a process that permits the coating of complex geometry surfaces such as internal passage ways of a turbine blade or vane. The coating should also desirably be uniform and thin in some instances to avoid interference with fluid flow in narrow channels of coated objects, for example. Furthermore, other desirable features and characteristics of the corrosion protection coatings will become apparent from the subsequent detailed description and the appended claims, taken in conjunction with the accompanying drawings and the foregoing technical field and background.

BRIEF SUMMARY

Exemplary embodiments of the invention provide methods of applying a barrier coat on a superalloy substrate. The methods include the steps of selecting a first liquid sol gel and wetting surfaces of the superalloy substrate with the selected first liquid sol gel. The wetted surfaces of the superalloy substrate are subjected to heat treatment. The heat treatment includes sintering of sol gel to oxide to produce a superalloy substrate that has a barrier coating. The barrier coating resists hot salt corrosion for an incubation period of such duration that an uncoated superalloy substrate under the same conditions would be corroded to a depth of about 2.0 mils.

In another exemplary embodiment, there is provided a method of producing a barrier coated substrate where the barrier coating is comprised of oxide derived from multiple layered sol gel coatings. The method includes the steps of forming the sol gel coating selecting a substrate; selecting a liquid sol gel; wetting the selected substrate with liquid sol gel; drying the wetted surfaces to form a dried coating on the wetted surfaces; applying heat to the dried coating sufficient to remove substantially all removable solvent from the dried coating; and sintering the dried coating to produce an oxide barrier coating. The barrier coating resists hot salt corrosion for an incubation period of such duration that an uncoated superalloy substrate under the same conditions would be corroded to a depth of about 2.0 mils.

The method further includes either repeating the steps from selecting the liquid sol gel to sintering; or repeating the steps from selecting the liquid sol gel to drying, followed by the step of sintering after the last repetition.

Another exemplary embodiment provides a coated substrate. The substrate has a barrier coating that is formed of an oxide composition derived from oxidation of at least one sol gel. The barrier coating resists hot salt corrosion for an incubation period of such duration that an uncoated superalloy substrate under the same conditions would be corroded to a depth of about 2.0 mils.

Another example provides an aerospace component that is subject to hot salt corrosion during use that has a barrier coating. The component may be of a superalloy and has complex structures with surfaces covered with a barrier coating. The barrier coating resists hot salt corrosion for an incubation period of such duration that an uncoated superalloy substrate under the same conditions would be corroded to a depth of about 2.0 mils.

BRIEF DESCRIPTION OF THE DRAWINGS

Various embodiments will hereinafter be described in conjunction with the following drawing figures, wherein like numerals denote like elements, and wherein.

DETAILED DESCRIPTION

Figure 1:
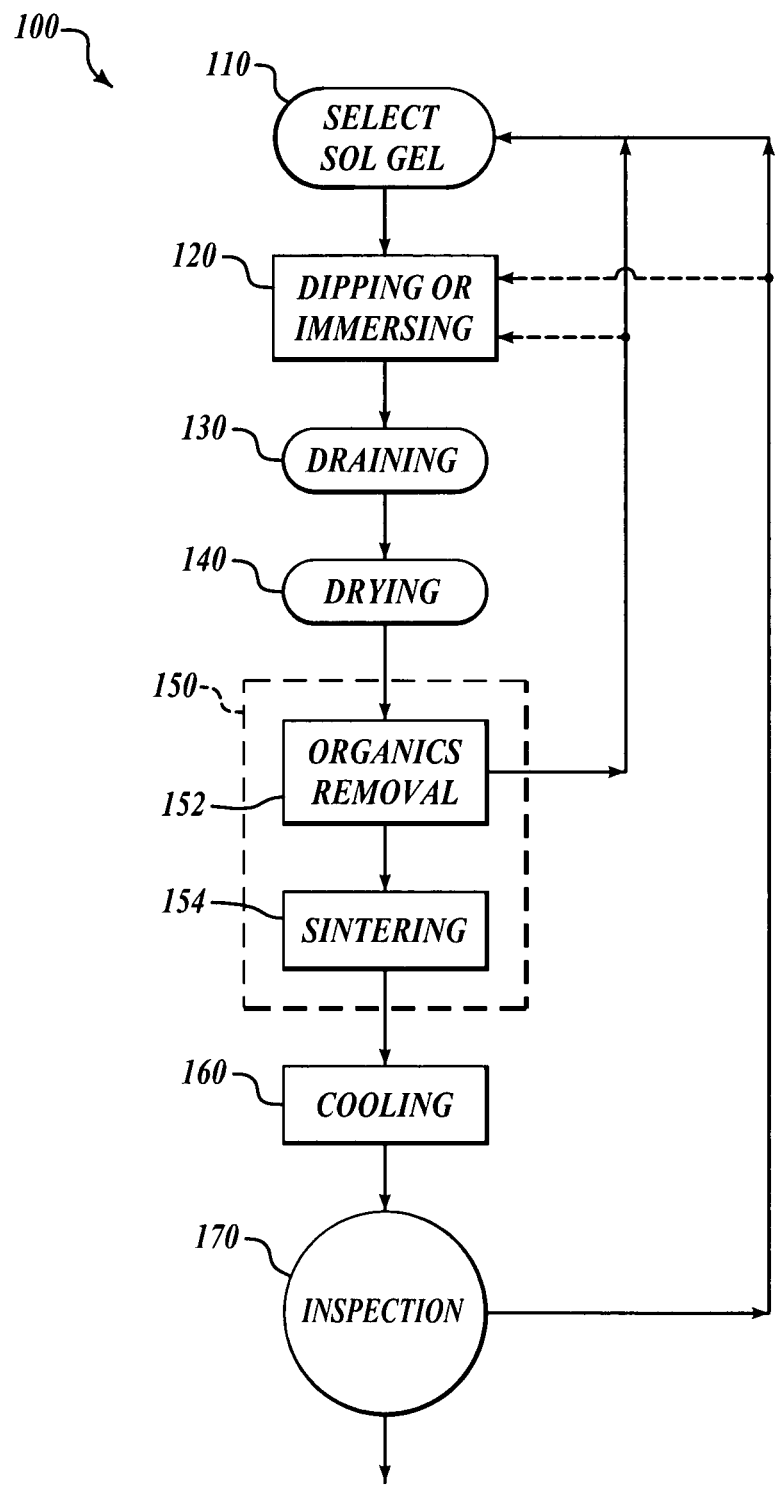
FIG. 1 is a flow chart illustrating an exemplary embodiment of a method of applying a coating.

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

While the following description will primarily refer to embodiments of barrier coatings derived from sol gels and methods of applying barrier coatings with reference to aerospace applications, the technology is of course much more widely applicable. For example, the barrier coatings may be applied to cast iron cookware to render surfaces more resistant to corrosion and pitting. The barrier coatings may also be applied to automotive devices, especially those that are exposed to high temperatures and/or corrosive environments. For example, the barrier coatings may be applied to engine parts, turbo-charger components, vehicle chassis and fenders that may be exposed to salt corrosion in winters when salt is used to control road ice, and the like. Indeed, the corrosion protection barrier coatings may find broad application in many fields. For brevity and simplicity, this disclosure focuses primarily on certain aerospace applications, and especially on coated superalloy components.

With regard to high temperature salt-induced corrosion in aircraft engines, in particular turbine engine components, it is theorized without being bound, that two types of hot corrosion may occur. Sulfate salts, such as sodium sulfate ($Na_2SO_4$), are comprised of basic ($Na_2O$) and acidic ($SO_3$) constituents. The corrosion types are commonly referred to as Type 1 (basic) and Type 2 (acidic) corrosion. Type 1 is aggressive in the range from about from about 1500° F. (815° C.) to about 1700° F. (926° C.). Type 2 hot corrosion is aggressive in the range from about 1000° F. (538° C.) to about 1350° F. (732° C.). The latter is especially aggressive in attacking uncoated superalloy surfaces. In aircraft engines, for example, modern air-cooled airfoils may have internal temperatures in the operating range from about 1200° F. (649° C.) to about 1700° F. (927° C.). In addition, "under the platform areas" (i.e. the non-airfoil surfaces of the turbine blade that are not in the direct path of hot gasses) of the airfoil may reach temperatures in the range of about 1100° F. (593° C.) to about 1300° F. (705° C.), which is within the range of Type 2 corrosion. External gas path surfaces of superalloy turbine airfoils may be within the range of 1200 to 2100° F. Accordingly, both types of hot corrosion conditions may be present on the same component but at different locations on the component. As previously noted, above 1700° F. (927° C.) sodium sulfate evaporates more rapidly than it is deposited and the salt-induced corrosion issue diminishes. When salt deposits are absent, oxidation becomes the life-limiting environmental degradation mode, particularly at temperatures above 1700° F. (927° C.). Commercial superalloy compositions are formulated to resist oxidation and hot corrosion by the thermal growth of thin chromia and/or alumina scales on their surface. Diffusion aluminide, platinum aluminide, and CoNiCrAlY coatings resist oxidation and hot corrosion by the thermal growth of alumina scales on their surface.

According to an exemplary embodiment, the barrier coating applied to a superalloy substrate resists hot salt corrosion for an incubation period of such duration that an uncoated superalloy substrate under the same conditions would be corroded to a depth of about 2.0 mils. In another exemplary embodiment, the barrier coating applied to a superalloy substrate resists weight loss in a hot salt corrosive furnace environment for a period of time that is at least about three times as long, and often between about three to about four times as long, as the period of time in which an uncoated superalloy coupon of 0.25 inch thickness in the same environment will lose about 5 percent of its weight due to hot salt corrosion. Accordingly, superalloy component life is significantly extended in practice.

Sol gel derived barrier coatings may also be deposited on top of diffusion coatings, such as platinum aluminide and CoNiCrAlY turbine airfoil coatings, for an additional improvement in the component's environmental life.

According to an exemplary embodiment, barrier coatings, derived from sol gel coatings, are provided as corrosion protection on objects. In a typical sol-gel process, the precursor is subjected to a series of hydrolysis and polymerization reactions to form a colloidal suspension. Once this occurs, the particles condense in a new phase, the gel, in which a solid macromolecule is immersed in a solvent. A variety of sol gels are known and a wide range of these may be used in embodiments of the present coatings. For example, useful sol gels may include, without limitation, sol gels of aluminum, silicon, zirconium, titanium, yttrium, hafnium, tantalum, and the like. Exemplary embodiments of barrier coatings may be formed from layered sol gel coatings that include two or more coating layers formed one above the other. Each of the sol gel coating layers may be formed from the same sol gel, or some of the coating layers may be formed of a different sol gel. While certain embodiments may provide a barrier layer formed from a thin coating of only one layer of sol gel, other embodiments may provide thicker barrier coatings derived from multi-layered sol gel coatings to potentially increase the barrier coating life span. Generally, thicker barrier coatings may be expected to endure harsh corrosive environments for a longer period of time than thinner barrier coatings, all other factors being equal.

In general the sol gel single coatings are thin, typically less than about 1 micron. But multiple layers, each of the same or a different chemistry, may build up the total thickness of the sol gel barrier coating to about 5 microns. The sol gel barrier coating may have a uniform thickness on both internal passageways and external surfaces. Sol gel barrier coatings with thicknesses less than about 5 microns are more resistant to cracking than thicker coatings. In general, oxides have a different thermal expansion than metals, which results in a thermal stress in oxide coatings during heating or cooling. Sol gel oxide coatings are so thin that this stress does not pose issues in terms of heat-induced cracking.

According to exemplary embodiments, sol gels may be applied to the surfaces of a substrate by any of several techniques. For example, thin films of liquid sol gel can be applied to a portion of a substrate by spin-coating or dip-coating. Other methods include spraying, or roll coating. Sol gel coatings can be applied to glass, metal and other types of substrates with these methods.

An exemplary embodiment of a method for coating superalloy substrates that have "complex structure" is illustrated in FIG. 1. The term "complex structure" includes structure that is not readily accessed by line of sight coating techniques, such as narrow internal passageways, internal pores, serpentine internal passage ways, dead-ended longitudinally extending internal cavities, and tightly stacked together external fins, without limitation. In this exemplary method 100, a liquid sol gel is selected, in step 110. The sol gel is desirably in liquid form with flow properties that facilitate penetration of the liquid sol gel into fine structures, facilitates wetting all surfaces to be coated by dipping or immersing or pumping the liquid sol gel into complex structures of the substrate. Embodiments and properties of liquid sol gels are discussed in more detail here below. Once a suitable liquid sol gel is selected, the dipping or immersion process of step 120 allows the liquid sol gel to wet the surfaces to be coated. Upon draining the wetted substrate, in step 130, a film of sol gel remains on the sol gel wetted surfaces of the substrate. When the sol gel dries, in step 140, it reacts with moisture in surrounding air to form an oxide-based coating. After drying, the coated substrate may be subjected to thermal treatment in step 150. The thermal treatment 150 may include a first step 152 of drying that includes heating to a relatively low temperature for a time sufficient to drive off volatile organic compounds ("VOCs"), such as the solvent used to make a liquid sol gel, from the coating. Temperature and dwell time of step 152 at the temperature may vary based on the solvent used and the inverse relationship of time and temperature (typically higher temperature requires shorter dwell time). In some exemplary embodiments, the temperature may usefully be in the range from about 150° C. to about 600° C., or more typically from about 250° C. to about 540° C. The substrate may be maintained at this temperature for about 15 minutes to about 20 hours, and more typically for about 1 hour to about 4 hours. When VOCs have been substantially driven off, in drying step 152, the coated, dried, and first-stage-heat treated substrate may be heated to a higher temperature in step 154 which is a sintering process that forms the oxide barrier coating. The sintering step 154 makes the coating denser and ensures a tightly adherent bond to the substrate. Temperature and dwell time at the sintering temperature may vary based on the sol gel used and the inverse relationship of time and temperature (typically higher temperature requires shorter dwell time). In some exemplary embodiments of step 154, however, the sintering temperature may usefully be in the range from about 550° C. to about 1200° C., or more typically from about 700° C. to about 1100° C. The substrate may be maintained at this sintering temperature for about 15 minutes to about 20 hours, and more typically for about 30 minutes to about 4 hours. After sintering is complete, the barrier coated substrate is cooled in step 160 at a rate of cooling that would not cause thermal shock and damage to the coating or the substrate. Typically, cooling in ambient air by convection cooling is useful, but other methods such as furnace cooling may also be used.

After cooling, the barrier coated substrate may be subjected to inspection in step 170. Typically, in exemplary embodiments, the coating is relatively thin, being from about 0.1 to about 5 microns thick. The barrier coatings may range from about 0.1 up to about 1.0 microns in thickness for a single layer and from about 0.3 to about 5.0 microns for a three layered coating. Due to the thinness of barrier coatings derived from a single layer of sol gel, it may be expected that a single layer barrier coating may have pin holes. This is undesirable in corrosion protection applications because the pin holes provide sites for corrosive attack to commence and thereby shorten the useful life of the coated substrate. As a consequence, in certain exemplary embodiments at least one additional coating may be layered over the first coating. This second layered coating may be applied by either repeating the process from step 110 to step, if a different liquid sol gel is to be selected, or by repeating steps 120 to 170, if the same liquid sol gel will be applied, to form the next sol gel coating layer. Of course, multi-layered sol gel coatings may be produced by repeating steps 110 or 120 to step 170 several times in sequence until a desired multi-layered layered sol gel coating has been achieved that can be sintered to produce a barrier coating. The mixed barrier coating may include not only oxides derived from the sol gels applied as coatings but also chemical combinations of oxides derived from these sol gels, if chemically different sol gels are applied in a single sol gel layer or in layers of a multi-layered sol gel coating.

In an alternative embodiment, to produce a barrier coating derived from a layered sol gel coating comprising two or more sol gels, the above-described steps of FIG. 1 may be amended. For example, as shown, after organics removal in step 152, and before sintering in step 154, the coated substrate may be returned to either step 110 or step 120. In step 110, a different liquid sol gel may be selected, and by following steps 120 to 152, a second layer of dried solgel on the substrate may be obtained. By repeating steps 110 to 152, several layers of sol gel coatings may be applied. When the desired layered sol gel coating has been applied, the substrate may then be subjected to steps 154-170. This process may produce a thicker barrier coating due to the multiple layers of sol gel applied. In addition, the process will produce a barrier coating that includes mixed oxides which are produced during sintering as a consequence of chemical reaction between the (different) sol gels in the applied layered coating. This type of "mixed oxide" barrier coating is useful and can be made for example by applying alternating coatings of silica and zirconia and then sintering the layered sol gel coatings to produce a $ZrSiO_4$ (zirconium silicate) barrier coating. Combinations of sol gels in different layers or applied in the same coating layer may be used to produce mixed oxide coatings such as for example, aluminum silicate, yttria-stabilized zirconia, and the like.

In exemplary embodiments that use a liquid sol gel for immersion or dipping or pumping coating, such as in step 120 above, the liquid may be obtained by diluting the sol gel with a suitable organic solvent, such as for example a suitable alcohol, ketone, aldehyde, aromatic hydrocarbon (benzene, toluene, etc.), aliphatic hydrocarbon (e.g. pentane, hexane, etc.), without limitation. A solution concentration of from about 10 to about 20 wt % sol gel is typically useful. For coating fine internal structure, the viscosity of the liquid coating should preferably be maintained at or below about 1 centipoise (cp) to facilitate flow into the fine structures. To ensure complete wetting of internal surfaces with the liquid sol gel, the substrate may the immersed in the liquid sol gel in a container and a vacuum of about 0.10 of an atmosphere may be pulled on the container. For complex passageways the solution may be pumped under pressure through the internal passageways to ensure complete coating. Alternatively, or in addition, the immersed substrate in the container may be subjected to ultra sonic or other sonar vibrations to ensure that entrapped air bubbles in the internal structure are freed from surfaces and that the surfaces of fine internal structures are wetted with liquid sol gel. Further, to ensure better wetting, in certain embodiments, surface tension modifiers such as soaps or detergents may be added to reduce the liquid sol gel surface tension and to increase the likelihood of complete internal surface wetting with the liquid sol gel.

In an exemplary embodiment, the substrate has a layered coating that includes three successive layers of sol gel. Potential sol gel candidates of particular interest in this particular embodiment are zirconia, alumina, titanium oxide, yttria, tantala, or silica, but others may also be used. The three-layered coating may include three layers of only one of these sol gels, or two layers of one sol gel and a third layer of another sol gel, or three layers each of a different sol gel. In this exemplary embodiment, the steps 152 to 110 are repeated to successively apply the three-layer coating. In the first two layers, at step 152 the coating is heated to the range 500° C. to about 1,000° C., and maintained in that temperature range for about 30 minutes to about an hour. After applying the last coating, in step 154 the multi-layered coating is heated to the range 600° C. to 1200° C. and maintained in that range for about 30 minutes to about 1 hour. Temperatures in the range 800° C. to 1,100° C. are generally effective for steel or superalloy substrates. The sintering step may be in an oxygen containing atmosphere, like air. But if the sintering is in a reducing atmosphere, subsequent oxidation of the coatings to produce an equilibrium oxide barrier coating may be necessary, for example to transform TaO to $Ta_2O_5$. Preferably, but not necessarily, the heating to sintering temperature range may be slow, taking in the range from about 2 to about 8 hours to reach sintering temperature.

After the substrate surfaces are completely wetted, the substrate is removed from the liquid sol gel and allowed to drain. Factors that influence the thickness of the sol gel film remaining on the substrate may include, for example, the rate of liquid sol gel drainage off substrate surfaces, the liquid sol gel's viscosity and its surface tension, and the humidity of the atmosphere, among others. As the film dries, it reacts with moisture in the surrounding air or from a gas supply to form an oxidized coating. Humidity may therefore have to be controlled.

A better understanding of the sol gel coating may perhaps be obtained by considering how an alumina coating is synthesized and not just deposited on the surface as it would be in a slurry coating from a solution containing alumina particles. The sol gel is transformed to an alumina coating by a chemical reaction with moisture in the surrounding atmosphere. The process may be further understood by considering the chemical reactions involved. A simplified example of the reactions involved in the synthesis of alumina is:—

$$Al(OC_4H_9)_3 + H_2O = Al(OC_4H_9)_2(OH) + C_4H_9OH \quad (I)$$

$$2Al(OC_4H_9)_2(OH) = 2AlO(OH) + yC_4H_9OH \quad (II)$$

$$2Al(OC_4H_9)_2(OH) + 2H_2O = 2Al(OH)_3 + 2C_4H_9OH \quad (III)$$

$$AlOOH \text{ or } Al(OH)_3 = Al_2O_3 + zH_2O \quad (IV)$$

In a typical sol gel process, the coated substrate are hydrolyzed and subsequently polymerized in a controlled humidity environment. For the work reported here no special environment or humidity control was used—making it more compatible with production facilities. Once visually dry, the coated substrate is usually left to stand for several hours to ensure that all of it has transformed to an oxide it may then be oven-heated uniformly in step 140 above, to drive off the organics.

In general, in multi-layered coatings, the layers may each be applied successively in separate immersion or dipping processes and only subjected to sintering after the final immersion or dipping. Thus, for example, in exemplary embodiments multiple sol gel layers of differing sol gel chemical composition may be applied, especially differing sol gel compositions that may react with each other during sintering to form an enhanced coating that adheres tightly to the substrate. For example, without limitation, alternating zirconia sol gel and silica sol gel layers may be applied to a substrate by successive immersion or dipping, with only a drying stage in between the successive immersions, dippings or pumping of the liquid sol gel though complex structures. After the final layer of sol gel is applied, the layered sol gel coating is sintered to form a composite multi-layer barrier coating such as $ZrSiO_4$ (zirconium silicate), aluminum silicate, yttrium silicate or yttria-stabilized zirconia coatings, and the like.

An alternative to multi-layer coatings of different composition is to mix the sol gels of the different compositions. For instance about 8% of a yittria sol may be mixed with a zirconia sol. A component may then be coated with the mixture of sol gels. The result is a yittria-stabilized zirconia coating. In another example, zirconia and silica sol gels may be mixed so that a coating of $ZrSiO_4$ (zirconium silicate) may be formed after a single wetting step. Because some sol gels are more reactive with moisture than others, extra care may have to be taken when drying components coated with mixed sol gels. This is particularly the case with solutions containing the alumina sol gel, which reacts very rapidly with moisture.

The drying operation may be combined with the sintering operation by first ramping a furnace to the drying temperature, holding for sufficient time to drive off the VOCs, and then ramping the furnace up to the normal sintering temperature. If the normal temperature used to dry the parts is increased then some sintering will occur. For multiple overlaid barrier coatings it is desirable to avoid significant sintering shrinkage in the final operation. This can be achieved by inserting a sintering operation after say each layer or after each 2 layers. Alternatively, increasing the drying temperature to say about 600° C. and using a slow ramp up to the drying temperature will allow the volatiles to be driven off and permit some sintering of the coating. Thus, when the final high temperature sintering is carried out the shrinkage is not so great that it results in failure of the multiple layered coating.

As indicated above, the barrier coatings may be applied to a wide variety of substrates, especially those that include complex structure not readily coated by line of sight techniques. In the aerospace industry, superalloy components such as airfoils, turbine blades, turbine nozzles, disks, seals, ducts, and liners and other components in that are exposed to aggressive hot corrosion and oxidation conditions may benefit from sol gel derived anti-corrosion barrier coatings.

EXAMPLE

The following example is non-limiting and merely presented to illustrate a comparison between the corrosion resistance of an embodiment of a sol gel coating, a commercial diffusion coating, and uncoated superalloy as a control in a corrosive Type 2 salt environment.

Superalloy MARM 247 was selected for a comparative test. Separate sets of buttons of superalloy MARM 247 were tested: a first set of buttons were uncoated as a control; a second set of buttons were coated with a diffusion aluminide coating and a third set was coated with sol gel, as described below. Diffusion aluminide coatings are supplied by several vendors, including Honeywell (of Greer, S Carolina).

The sol gel coated buttons were prepared by immersing the cleaned buttons first in a liquid sol gel comprising 20% silica gel in anhydrous ethyl alcohol. After drying the sol gel-wetted buttons for about 1 hour at 300° C., the buttons were dipped in a second sol gel bath. This bath contained 20% of zirconia gel also in anhydrous ethyl alcohol. The wetted buttons were removed, air dried for about 1 hour at 300° C., and then heated in a vacuum furnace to 1,000° C. for 1 hour followed by oxidation at 900° C. for 30 minutes in air in the furnace. This formed a $ZrSiO_4$ coating on the buttons with a thickness of about 2 microns.

The diffusion aluminide coated buttons were prepared by Honeywell using commercial production process parameters.

Buttons of each kind were tested in a furnace at 1290° F. in which a Type 2 corrosive environment had been created. The buttons were each coated with a 60:40 water-based solution of sodium and magnesium sulphate salts. The mixture had a dry concentration of 1 gram sulphate/cm$^2$ on button surfaces. Moist air (air to which steam was added) with 0.5% $SO_2$ flowed through the furnace and over the button surfaces at a flow rate of 2.6 liter/min. The samples were inspected every 24 hrs. Inspection involved removing the salt deposit-covered button, weighing the button and then reapplying the salt deposit to button surfaces before returning the button to the furnace. This is an aggressive environment and is an accelerated test resulting in failure orders of magnitude sooner than might occur in a turbine engine operating in a corrosive environment.

Figure 2:
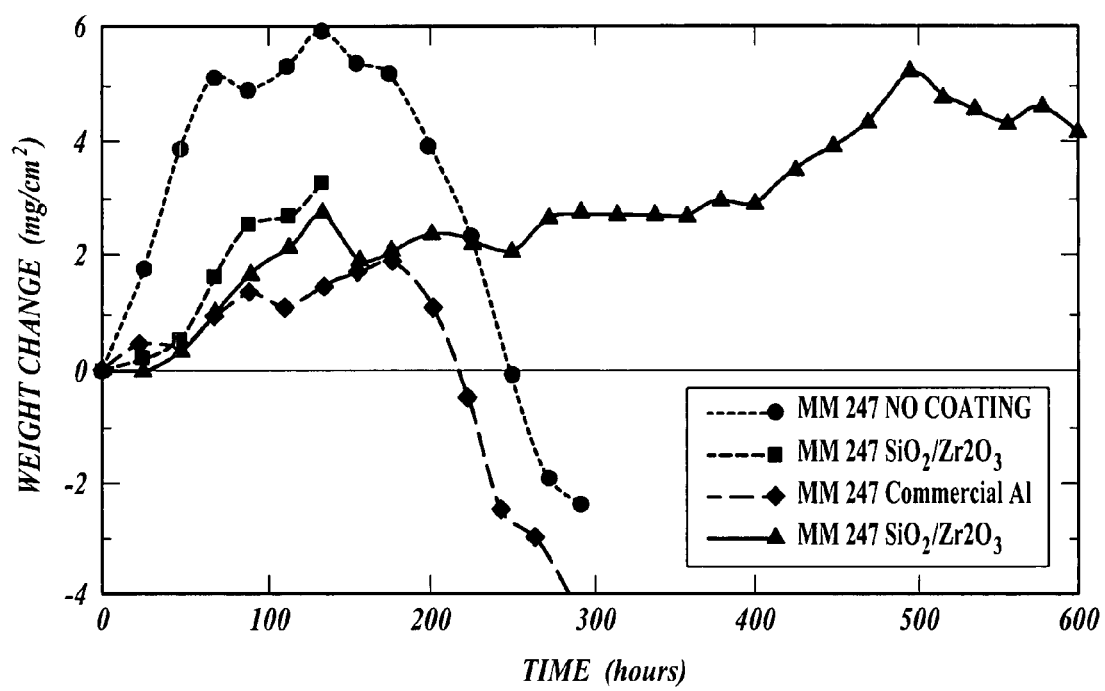
FIG. 2 is a graph depicting weight change (in mg/cm$^2$) on the Y-axis versus time (in hours) on the X-axis comparing hot corrosion rates at 1290° F. (699° C.) between substrates coated in accordance with an exemplary embodiment, uncoated substrates and substrates coated with a commercial diffusion aluminide coating.

The results are shown graphically in FIG. 2. Note that one $SiO_2/ZrO_3$ graph designated with black squares terminates at about 150 hours corresponding to when the coated button represented was removed for testing. Testing of the other $SiO_2/ZrO_3$-coated button continued and is represented by the graph of dark triangles. The sol gel coated buttons showed no weight change after 48 hours in the Type 2 environment, indicating little or no corrosion product formation. The uncoated buttons increased in weight indicating corrosion products were present at 48 hours. The sol gel samples then began to gradually increase in weight, but after 600 hours there was as yet no catastrophic weight gain, nor catastrophic weight loss that might indicate spalling off of corrosion products. The uncoated buttons showed dramatic weight loss after 160 hours due to spalling.

The commercial diffusion aluminide treated buttons which were in the same furnace test showed a weight loss at around 150 hours. The results showed apparently better performance of the uncoated control buttons as compared to diffusion coated buttons. Other tests in the same type of environment showed diffusion coated buttons had similar corrosion resistance to uncoated buttons.

From the results shown in FIG. 2, the $ZrSiO_4$ sol gel coated superalloy MARM 247 buttons demonstrated superior Type 2 corrosion resistance to both uncoated buttons and aluminide coated buttons.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A method of applying a barrier coating on a superalloy substrate having an external surface and an internal passageway, the method comprising:
   selecting a first liquid sol gel comprising a precursor to be used in a sol-gel process to form a solid, oxide-based first layer of a first sol gel selected from the group consisting of zirconia, silica, alumina, titanium oxide, yttria, hafnia, and tantala, and combinations thereof, the first liquid sol gel having a viscosity at or below 1 centipoise;
   wetting the external surface and the internal passageway of the superalloy substrate with the selected first liquid sol gel to form a wetted substrate, the first liquid sol gel transforming into the oxide-based first layer in situ on the superalloy substrate by a chemical reaction with moisture in the surrounding atmosphere, the oxide-based first layer comprising a first sol gel layer;
   heating the oxide-based first layer on the external surface and the internal passageway of the superalloy substrate to a first temperature in a range of about 150° C. to about 600° C. to drive off volatile organic compounds from the oxide-based first layer;
   selecting a second liquid sol gel comprising a precursor to be used in the sol gel process to form a solid, oxide-based second layer of a second sol gel different from the first sol gel and selected from the group consisting of zirconia, silica, alumina, titanium oxide, yttria, hafnia, and tantala, and combinations thereof, the second liquid sol gel having a viscosity at or below 1 centipoise;
   applying the second liquid sol gel over the oxide-based first layer, the second liquid sol gel transforming into the solid, oxide-based second layer in situ on the oxide-based first layer on the superalloy substrate by a chemical reaction with moisture in the surrounding atmosphere, the oxide-based second layer comprising a second sol gel layer;
   heating the oxide-based second layer to the first temperature in a range of about 150° C. to about 600° C. to drive off volatile organic compounds from the oxide-based second layer;
   applying a third liquid sol gel over the oxide-based second layer, the first, second and third sol gel layers comprising a layered sol gel coating on the superalloy substrate; and
   subjecting the superalloy substrate including the layered sol gel coating to a heat treatment at a higher second temperature in a range of about 550° C. to about 1200° C., the heat treatment comprising sintering the layered sol gel coating to produce the barrier coating, the barrier coating resisting hot salt corrosion for an incubation period of such duration that an uncoated superalloy substrate under the same conditions will corrode to a depth of about 2.0 mils,
   wherein the sintering of the layered sol gel coating is in a reducing atmosphere and the method further comprises subsequent to the sintering of the layered sol gel coating, oxidizing the barrier coating to produce an equilibrium oxide barrier coating, and
   wherein the step of wetting the external surface and the internal passageway of the superalloy substrate comprises adding a surface tension modifier to reduce a surface tension of the selected first liquid sol gel to form the wetted substrate on the external surface and the internal passageway of the superalloy substrate.

2. The method of claim 1, wherein the barrier coating comprises a thickness in a range from about 0.5 to about 5.0 microns.

3. The method of claim 1, further comprising, prior to wetting the surfaces of the superalloy substrate, applying a first coating comprising at least one of diffusion aluminide, platinum aluminide, and cobalt-nickel-chrome-aluminum-yttrium.

4. The method of claim 1 wherein the barrier coating comprises a zirconium silicate barrier coating and the first sol gel coating comprises one of silica or zirconia and the second sol gel coating comprises the other of zirconia or silica and the step of subjecting the superalloy substrate to a heat treatment at a higher second temperature comprises heating to about 1000° C.

5. The method of claim 1, wherein the superalloy substrate comprises an object selected from the group of gas turbine components consisting of airfoils, turbine blades, turbine nozzles, disks, seals, ducts, and liners.

6. A method of producing a barrier coated substrate, the method comprising:
   (a) selecting a superalloy substrate to be coated, the superalloy substrate having an external surface and a serpentine internal passageway;
   (b) selecting a first liquid sol gel to be used in a sol-gel process to form a solid, oxide-based first layer, the first liquid sol gel comprising a precursor to a first sol gel selected from the group consisting of zirconia, silica, alumina, titanium oxide, yttria, hafnia, and tantala, and combinations thereof;
   (c) wetting the external surface and the internal passageway of the selected substrate with the selected first liquid sol gel to form a wetted external surface and a wetted internal passageway of the selected substrate, the first liquid sol gel transforming into the solid, oxide-based first layer in situ on the superalloy substrate by a chemical reaction with moisture in the surrounding atmosphere, the oxide-based first layer comprising a first sol gel layer selected from the group consisting of zirconia, silica, alumina, titanium oxide, yttria, hafnia, and tantala, and combinations thereof;
   (e) heating the oxide-based first layer to a first temperature in a range of about 150° C. to about 600° C. to drive off volatile organic compounds from the oxide-based first layer;
   (f) selecting a second liquid sol gel that is different from the first liquid sol gel and applying the second liquid sol gel over the oxide-based first layer, the second liquid sol gel comprising a precursor to a second sol gel selected from the group consisting of zirconia, silica, alumina, titanium oxide, yttria, hafnia, and tantala, and combinations thereof, the first and second sol gels being different;
   (g) sintering the oxide-based first layer and the second liquid sol gel at a higher second temperature in a range of about 550° C. to about 1200° C. to form a mixed oxide barrier coating; and
   (h) repeating steps (b) to (g); or repeating steps (b) to (f) and carrying out step (g) after a final repeating of steps (b) to (f),
   wherein the step of wetting the external surface and the internal passageway of the superalloy substrate comprises adding a surface tension modifier to reduce a surface tension of the selected first liquid sol gel to form the wetted external surface and the wetted internal passageway of the selected substrate,
   wherein the sintering of the oxide-based first layer and the second liquid sol gel is in a reducing atmosphere and the method further comprises subsequent to step (g), oxidizing the mixed oxide barrier coating to produce an equilibrium oxide barrier coating.

7. The method of claim 6, wherein the step of repeating steps (b) to (g) or repeating steps (b) to (f) comprises selecting a different sol gel in at least one repetition of step (b), step (f), or both.

8. The method of claim 6, further comprising subjecting the external surface and the internal passageway to a vacuum of about 0.10 of an atmosphere during the step of wetting the external surface and the internal passageway.

* * * * *